May 15, 1956     G. E. COMSTOCK 3D     2,745,437
REINFORCED CERAMIC BODY OF REVOLUTION

Filed Sept. 12, 1951

Inventor
GEORGE E. COMSTOCK III
By *George Comstock*
Attorney

United States Patent Office 2,745,437
Patented May 15, 1956

2,745,437

REINFORCED CERAMIC BODY OF REVOLUTION

George E. Comstock 3d, Holden, Mass., assignor to Norton Company, Worcester, Mass., a corporation of Massachusetts Application September 12, 1951, Serial No. 246,305

6 Claims. (Cl. 138—64)

The invention relates to cylinders and other bodies of revolution, for use as bearings, liners, sleeves, molds, cams, guides, and the like and a method of making them.

One object of the invention is to provide cylinders, etc. for use as bearings, etc. of ceramic material, which are strongly reinforced. Another object of the invention is to provide a facile and economical method for making such cylinders, etc. Another object is to provide cylinder liners for internal combustion engines which will increase the useful lives of the engines many fold. Another object of the invention is to provide superior pump liners. Another object is to provide bearings of long life and adequate load carrying capacity. Another object is to provide nozzles of many types, of superior resistance to wear and to erosion and of great strength.

Another object of the invention is to provide an inexpensive method of reinforcing ceramic cylinders and other bodies of revolution. Another object is to provide a method of the type indicated which accurately aligns a ceramic part and a metal reinforcing part. Another object is to provide a method of manufacturing a plurality of cylindrical or liner portions of ceramic material precisely aligned with respect to each other and reinforced with metal parts. Another object is to reinforce ceramic pieces axially as well as radially.

Another object is to provide a three-component article in which one component is a wear resisting part, another component is a reinforcing part and the third component permits one or both of the other components to be irregular while mating perfectly with each and perfectly transmitting stress from the reinforcing component to the wear resisting component. Another object is to provide a two-component article in which one component is a wear resisting part and the other component is a reinforcing part and which permits the wear resisting part to be irregular while mating perfectly with it and perfectly transmitting stress thereto.

Other objects will be in part obvious or in part pointed out hereinafter.

Figure 1:
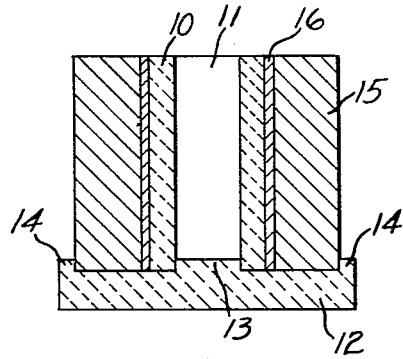
Figure 2:
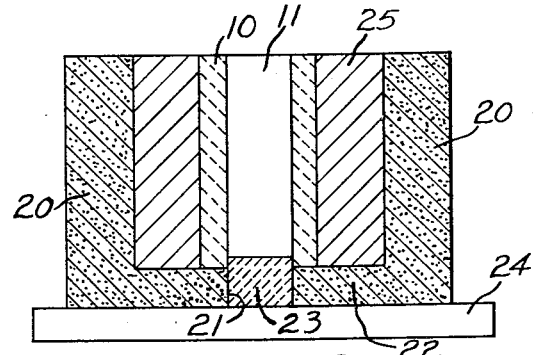
Figure 3:
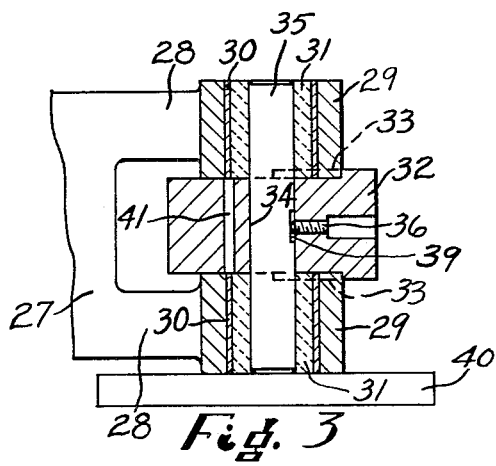
Figure 4:
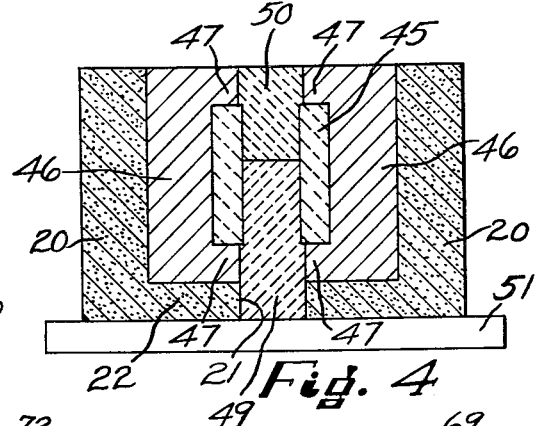
Figures 5, 6:
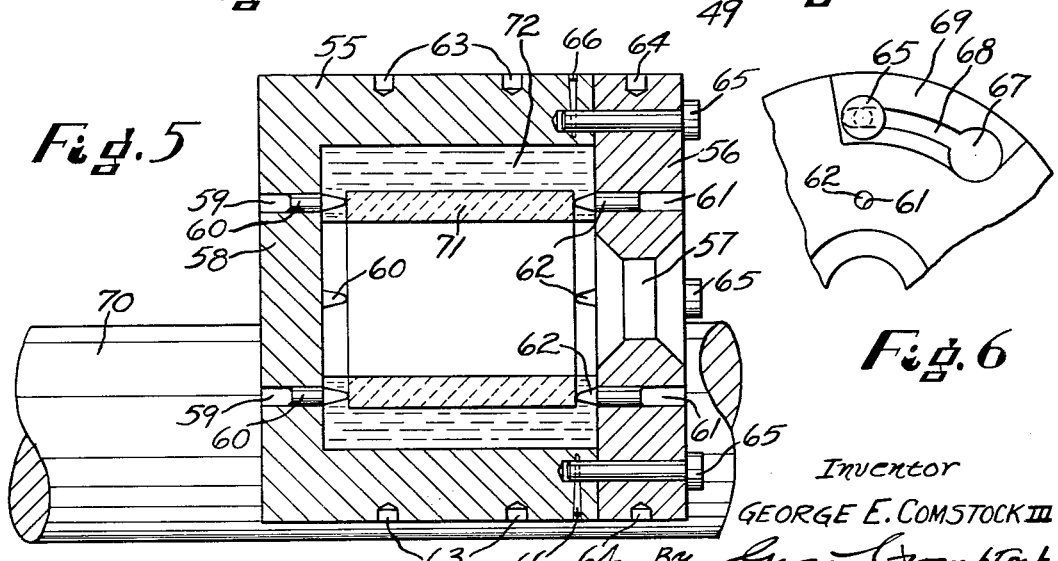

In the accompanying drawings illustrating a plurality of articles made in accordance with this invention and illustrating also several embodiments of the method of the invention, Figure 1 is a vertical sectional view of a reinforced ceramic sleeve for use for example as a bearing showing also the assembly for its manufacture, Figure 2 is a sectional view similar to Figure 1 illustrating another embodiment of the invention, Figure 3 is another vertical sectional view illustrating the manufacture of a pair of aligned bearings and the product resulting from such manufacture, Figure 4 is a sectional view similar to Figures 1 and 2 illustrating still another embodiment of the invention, Figure 5 is a vertical sectional view of a centrifugal mold and the assembly for the manufacture of a reinforced ceramic sleeve for use for example as a bearing or a cylinder liner or for other purposes as indicated in the objects, Figure 6 is a fragmentary end elevation of the mold of Figure 5.

The ceramic body of revolution may be made by sintering relatively pure refractory material or it may be made by mixing granular refractory material with clay or clays with or without a flux, pressing in a mold, thereafter firing the pressed body in a kiln to vitrify the clay or clays. This ceramic body of revolution according to the invention is made of refractory ceramic material having high compressive strength, at least 100,000 pounds per square inch, and the major portion thereof is material selected from the group consisting of silicates, other oxides and carbides. This refractory material should have a hardness of at least 7 (quartz) on Mohs's scale.

In a preferred example of the manufacture of this ceramic body out of oxide material I may use aluminum oxide powder produced by the Bayer process consisting of alumina to the extent of 99.5%. I first ball mill this with iron balls until the particle size is in the neighborhood of 3 microns and I then wash this powder by decanting with dilute hydrochloric acid until it is comparatively free from iron picked up from the iron balls and from the mill. Thereafter I wash the powder with distilled water and stop when the pH of the wash water is approximately 3, as it is advantageous to have the powder slightly acidic. I then suspend this fine alumina in water and cast it in plaster molds in the conventional manner following which the cast material is dried and removed from the mold and then fired in a kiln at a top temperature of 1825° C. for a few minutes. At this temperature the alumina particles sinter together and the whole mass shrinks to a dense material with a specific gravity of about 3.7. Thereafter the working surface of this ceramic body of revolution is internally ground with a diamond grinding wheel to produce a smooth and reflective surface.

In place of slip casting the ball milled alumina it can, after the acid treatment and washing above described, be pressed into the desired shape, usually a cylinder, in a steel mold under pressures from 2 to 10 tons per square inch.

Articles made as above described have a hardness of 9 on Mohs's scale and when reinforced as will hereinafter be described they make excellent bearings, liners, sleeves, molds, cams, guides and the like. However I have found that for many practical purposes it is unnecessary to use oxide material of such high purity as is the Bayer process alumina nor is it necessary to fire it at such a high temperature. Thus to the alumina I can add some clay or clays and mold and fire such mixtures. As an example I take what is known as regular alumina, which is made by reducing bauxite in an electric furnace and is usually about 95% Al$_2$O$_3$, ball mill this material to produce particles between 2 and 25 microns in size, acid treat the ball milled alumina and then wash it as above described, then mix it with 10% of kaolin (which is a variety of clay) and a small amount of water to make the mix moldable, then mold the cylinder or other shape and fire the molded piece at a temperature of about 1650° C. thereby obtaining articles of a hardness of at least 8 on Mohs's scale. The article is then internally ground, and a very smooth and true reflective surface can be imparted thereto with a diamond grinding wheel.

I can also add to such a mixture a flux such as a compound of magnesium or calcium, thus lowering the firing temperature. Thus by adding for example up to 3% of lime or magnesia the firing temperature will be lowered to about 1600° C. Lime and magnesia can be used in admixture with each other. A typical analysis of a body of revolution made as above described is given in Table I.

Table I

| | Percent |
|---|---|
| $Al_2O_3$ | 88.8 |
| $SiO_2$ | 8.8 |
| MgO | 1.0 |
| CaO | 0.8 |
| $Fe_2O_3$ | 0.5 |
| $Na_2O$ | 0.1 |

In case clay is used in substantial quantity, an appreciable amount of mullite will appear in the finished article. It will be seen that by increasing the quantity of clay in proportion to the alumina, a gradual transition will occur in the finished article from substantially 100% alpha alumina to 100% mullite and I have found that all mixtures are useful for my bodies, though for the more severe applications, the compositions with high alpha alumina are preferred.

It should be mentioned that another practical means of fabricating the bodies is by hot pressing the molding powder in a graphite mold at a pressure of roughly 2500 pounds per square inch and a temperature between 1200° and 1700° C., the temperature being chosen to suit the particular composition.

If to the ball milled alumina above I had added magnesium oxide alone, the first effect would have been to inhibit the grain growth of the aluminum oxide although the body would have sintered satisfactorily. Many experiments have shown that bodies containing from ½ to 1½% magnesia and as a consequence sintering to much finer crystal structures are stronger and therefore more suitable for my purposes than when magnesia is absent. When the magnesium oxide content reaches approximately 1½%, micro crystals of magnesium spinel are observable in the fired product. As the amount of magnesia is increased above this point, the volume of spinel crystals in the mass increases very rapidly until the whole structure is converted to spinel at a magnesia content of 10%, although the stoichiometric proportion of magnesia in magnesium spinel is 28%. The explanation is that at a high temperature of firing, such as cone 35, alpha alumina is soluble in magnesium spinel to such an extent that although the crystal structure is not changed, the alumina content may be as high as 90%.

This high alumina spinel is very abrasion resistant and in some applications is as good as sintered alpha alumina. In some cases it is superior due to the isotropic nature of the spinel. As more magnesia is used in the mixture, the spinel approaches the theoretical composition and the hardness declines but is still sufficient, when there is no extra alumina, to be highly satisfactory for many applications. Magnesium spinel is $MgO \cdot Al_2O_3$ and it can be made in the electric furnace.

The ceramic portion of my article can also be made of mullite. Mullite is $3Al_2O_3 \cdot 2SiO_2$ and can be made in the electric furnace. The ceramic portion of the article can be made of zirconia or stabilized zirconia. Stabilized zirconia is zirconia, $ZrO_2$, stabilized with from 3% to 6% of lime CaO or magnesia MgO. The way to synthesize fused stabilized zirconia with from 3% to 6% of lime in solid solution in the zirconia is fully set forth in U. S. Letters Patent No. 2,535,526 granted December 26, 1950, on application of Ballard and Marshall. The correct definition of material described in that patent and including also zirconia stabilized with magnesia or with other oxide is—stabilized zirconia the crystals of which are predominantly cubic. Unstabilized zirconia is monoclinic in crystal habit. Ceramic bodies of revolution made out of any of magnesium spinel, mullite and stabilized zirconia, the crystals of which are predominantly cubic should be made in the manner already explained for making such components out of aluminum oxide.

The patent literature is replete with examples of ceramic compositions the principal component of which is alumina many of which are quite satisfactory for the manufacture of the ceramic body of revolution of my invention. The following table identifies particular patents describing compositions the principal component of which is alumina, all of which compositions are satisfactory for my purpose, and the table includes a brief identification of an illustrative embodiment of the component with which the alumina is bonded or in some cases gives an illustrative embodiment of the total composition.

Table II

| Inventor | Patent No. | Date | Brief Description |
|---|---|---|---|
| F. B. Norton | 187,167 | Feb. 6, 1877. | Corundum bonded with clay and feldspar. |
| Saunders and White | 1,240,490 | Sept. 18, 1917. | Alumina containing zirconia bonded with vitrified clay. |
| Jeppson and Dietz | 1,292,953 | Jan. 28, 1919. | Graded particles of $Al_2O_3$ bonded with ball clay, slip clay and feldspar. |
| Purdy, Beecher and Klein. | 1,394,442 | Oct. 18, 1921. | Sintered magnesium aluminum spinel with an excess of alumina. |
| M. C. Booze | 1,616,525 | Feb. 8, 1927. | Sillimanite. |
| Saunders, Milligan and Beecher. | 1,829,761 | Nov. 3, 1931. | Combination of oxides. |
| Milligan and Quick | 1,910,031 | May 23, 1933. | Ball clay 31%. Feldspar 52%. Flint 8%. Whiting 6%. Magnesia 3%. |
| Milligan and Armitage. | 1,987,861 | Jan. 15, 1935. | Slip clay 75 parts. Ball clay 25 parts. Aluminum phosphate 20 parts. |
| C. W. Saxe | 2,118,798 | May 24, 1938. | 1% of bentonite. |

The ceramic body of revolution can be made of a hard carbide. Silicon carbide has a hardness considerably in excess of 9 (corrundum) on Mohs's scale. By bonding silicon carbide with clay or other ceramic bonds very hard and wear-resistant articles can be made. Self-bonded silicon carbide is known, the process of manufacture of which consists in recrystallizing the silicon carbide granules but I prefer to use ceramic bonded silicon carbide for the ceramic portion of my article as stronger and denser bodies principally of silicon carbide can be made by bonding the silicon carbide granules with ceramic materials rather than by the recrystallization process. The following table identifies patents dealing with ceramic bonded silicon carbide compositions and briefly identifies an illustrative embodiment of such composition in the same manner as Table II.

Table III

| Inventor | Patent No. | Date | Brief Description |
|---|---|---|---|
| M. F. Beecher | 1,439,285 | Dec. 19, 1922. | Feldspar 60%–75%. Ball clay 40%–25%. Slip clay 0%–15%. |
| Beecher, Klein and Greenwood. | 1,546,115 | July 14, 1925. | Equal parts of ball clay, slip clay and feldspar. |
| Milligan and Lombard. | 2,132,005 | Oct. 4, 1938. | 75 parts of a frit made from 33.8% of borax, 26.7% of boric acid and 39.5% of flint, 25 parts of ball clay and 10 parts of silicon powder. |
| Milligan and Lombard. | 2,158,034 | May 9, 1939. | 75 parts of the borax, boric acid and flint frit of Patent 2,132,005 together with 25 parts of ball clay and 5 parts of mullite. |
| Lombard and Milligan. | 2,332,241 | Oct. 19, 1943. | $SiO_2$ 40% to 70%. $ZrO_2$ or $TiO_2$ 2% to 20%. $Al_2O_3$ up to 30%. Alkaline earth oxide 2% to 15%. Boron oxide 5% to 25%. Alkaline metal oxide .5% to 5%. |

Boron carbide can be hot molded to make ceramic pieces of adequate strength and great hardness. No extraneous materials are used, fine particles of boron carbide being hot pressed in graphite molds to produce the desired articles and the ceramic component of my invention can be made of such molded boron carbide. Boron carbide, $B_4C$, has a hardness even greater than that of silicon carbide and is said to be second only to the diamond in hardness of all materials known. The synthesis of boron carbide and how to mold it are described in various patents to the late R. R. Ridgway particularly Nos. 1,897,214; 2,155,682; 2,123,158; 2,037,786; 2,121,744 and 2,125,588.

The ceramic component of my invention can also be made of any of the carbides which are now used to make cutting tools, that is to say out of tungsten carbide, titanium carbide or tantalum carbide, or out of mixtures of two of the foregoing or all three thereof. Cutting tools and portions thereof are now made out of these carbides by taking the powder or powders thereof and mixing such powder or powders with a lesser amount of bonding metal of the iron group, to wit, cobalt, nickel and iron of which cobalt seems to be preferred. After the powders are thoroughly mixed a quantity thereof is charged into a suitable mold or die and a piece is pressed therefrom subsequent to which the piece is sintered. All of this is well known and has been described in many patents so I need not further particularize thereon. Similarly chromium carbide and zirconium carbide can be used to make hard and strong articles, such carbides being likewise bonded with a metal of the iron group usually cobalt.

Referring now to Figure 1, a ceramic cylinder 10 made out of ceramic material within the foregoing disclosure has a ground internal surface 11 and is located on a refractory plate 12 having a raised cylindrical portion 13 just fitting the bore of the cylinder 10 and having also a raised circular lip 14 inside of which fits, with a snug fit, a steel sleeve 15. I place this assembly in a suitable furnace and raise it to a temperature just above the melting point of a metal or alloy selected in accordance with considerations to be hereinafter described. I then remove the assembly from the furnace and pour the metal, which I have previously melted, into the space between the steel sleeve 15 and the ceramic cylinder 10. Allowing the assembly to cool, the molten metal eventually freezes to form an intermediate sleeve 16 of metal or alloy. It will now be seen that the exterior of the ceramic cylinder 10 can be rough, that is to say unground and just as it was when the piece was formed, and the interior of the steel sleeve 15 can be rough, that is to say having a surface resulting from a casting operation or possibly from a simple machining operation such as with a lathe and nevertheless the three parts will mate perfectly. As the three parts or components cool down to room temperature the steel sleeve 15 shrinks and so does the intermediate sleeve 16 and while the ceramic cylinder 10 also shrinks its coefficient of expansion is less than that of the metal components and so the ceramic cylinder 10 is placed under high compression which gives it the ability to withstand heavy internal stresses. The foregoing is an example and the sleeve 15 does not have to be made of steel in all cases, it can be made of bronze, or aluminum or other metal of adequate strength having a melting point above the melting point of the metal or alloy selected to form the intermediate sleeve 16.

Figure 2 is illustrative of another embodiment of the invention. The ceramic cylinder 10 is mounted in an open mold 20 having the shape of a crucible with a central hole 21 in a flat bottom portion 22, and a plug 23 extends for a short distance into the bore of the cylinder 10, which has the ground internal surface 11, for the purpose of accurately centering the cylinder 10. The mold 20 can be a tamped piece made out of refractory cement, such as 100 parts of alumina cement, 3 parts of monoaluminum orthophosphate and 2 parts of water. After tamping the piece is air dried and is then ready for use. The plug 23 is preferably made of graphite so as to be readily removable from the bore of the cylinder 10. This assembly is mounted on a refractory plate 24 and is then placed in a furnace and raised to a temperature not too far below that of a particular steel selected to form a sleeve 25. The requirement in this case is that the molten metal shall not crack the ceramic cylinder 10 by heat shock and if the latter is heated to about 800° C. it is usually safe but higher temperatures are safer. When the assembly has reached the desired temperature it is removed from the furnace and molten steel is poured into the space between the cylindrical wall of the crucible 20 and the ceramic cylinder 10 and the assembly is allowed to cool whereupon eventually the steel freezes and later on contracts and when room temperature is reached the sleeve 25 exerts great compressive force against the ceramic cylinder 10. Here again it will be seen that it is unnecessary to grind the exterior of the ceramic cylinder 10 yet the components 10 and 25 mate perfectly. Instead of making the sleeve 25 out of steel it can be made out of other metal or alloy such as bronze or brass in which case the preheating of the assembly can be to a lower temperature.

Since some of the molten steel or other metal will penetrate between the bottom of the ceramic cylinder 10 and the bottom portion 22 of the crucible 20 and since the specific gravity of steel is much higher than that of the ceramic material I hold the cylinder 10 down in any suitable way such as by laying a straight steel bar, not shown, diametrically across the top of the assembly of Figure 2, and in order that it shall not crack the hot ceramic cylinder 10 this steel bar should be heated to a dull red. This precaution should preferably also be taken in other embodiments of the invention although the portion 13 will sometimes hold down the cylinder 10. The graphite plug 23 cannot be relied upon for this purpose since the cylinder 10 expands away from it during the heating.

Another embodiment of the invention is illustrated in Figure 3. A machine element 27 preferably made of steel but which might be made of bronze or other metal may be a connector or a bracket or the like. It has a pair of arms 28 terminating in hub portions 29 in which are intermediate sleeves 30 made of lower melting point metal and in compression against ceramic bearings 31 made out of ceramic material within the foregoing disclosure. This composite article can be made by providing a jig 32 having semi-circular shoulders 33 to fit the outside of the hub portions 29 and having a central bore 34 in which is located an arbor 35 held in position by a screw 36 in threaded engagement with the jig 32 and engaging a cut-out 39 in the arbor 35 which aligns the ceramic bearings 31. This assembly may conveniently be mounted on a refractory plate 40 and is placed in a furnace and heated to a temperature above the melting point of the metal which will form the intermediate sleeves 30. When the assembly is removed from the furnace, metal is poured between the upper ceramic bearing 31 and the upper hub portion 29 and it runs down through a hole 41 in the jig 32 into the space between the lower ceramic bearing 31 and the lower hub portion 29 and finally fills both the lower and the upper spaces and then, upon cooling, the same action as hereinbefore mentioned occurs, namely that the metal freezes to form the intermediate sleeves 30 and the hub portions 29 contract (tending to do so faster than the bearings 31) to place the bearings 31 under high compression. When the assembly has cooled, the screw 36 is loosened, the arbor 30 is removed, the jig 32 is given a tap to break the gate formed in the hole 41 and then the jig 32 is removed. The ceramic bearings 31 were internally ground before assembly but, as in the other cases, were not or did not have to be externally ground nor was it necessary to grind the bores in the hub portions 29 or to finish them other than roughly.

Figure 4 illustrates another embodiment of the invention in which a ceramic cylinder 45 made out of ceramic material within the foregoing disclosure is encased in a metal support 46 which is in radial compression against it and has integral flange portions 47 exerting axial compression upon it. The metal support 46 may be composed of any metal or alloy but preferably of a fairly hard metal or alloy which will not deform to relieve the compression. Desirably the metal support 46 is made of steel or cast iron but brass or bronze can also be used. This support 46 is likewise made by casting metal around the ceramic cylinder.

For making the bearing of Figure 4 I utilize an open mold 20 already described having a central hole 21 in which fits the large end of a two-diameter graphite core 49 the smaller diameter of which fits the bore of the cylinder 45 so that the cylinder 45 is supported by the core 49. Also in the bore of the cylinder 45 is the small end of a second two-diameter graphite core 50 upon which, after the assembly has been heated, I place diametrically across the top of the assembly a heated steel bar as already described, thereby to hold the cylinder 45 down. The assembly is placed upon a refractory plate 51 and put into a furnace wherein the assembly is heated to a temperature not too far below the melting point of the molten metal, whereupon the assembly is removed from the furnace and the metal is poured to form the support 46. Then the assembly is allowed to cool and the metal freezes and cools down and as it does so it contracts against the periphery of the ceramic cylinder and also against the ends thereof exerting high compressive force thereon. The graphite cores 49 and 50 can readily be machined out of the bore of the article which can then be given a final internal finishing as by grinding.

The sleeves 16 and 30 are compression transmitting sleeves whereas the sleeves 25 and 46 themselves generate the compression. Accordingly whereas the sleeves 25 and 46 should be fairly thick it is desirable that the sleeves 16 and 30 be thin otherwise the complete article may be somewhat weakened. Since the sleeves 16 and 30 are thin the molten metal which is to form them will prematurely freeze unless the assembly is at or above the melting point of the metal being poured. This is why in the embodiments of Figures 1 and 3 the assembly should be heated to above the melting point of the metal to be poured so that at the actual time of pouring the ceramic cylinders 10 and 31 and the outside metal parts 15, 29 and 32 will be at least as hot as the melting point of the metal being poured.

Because the assemblies of Figures 1 and 3 are heated to just above the melting point of the metal to be poured and because these assemblies include metal parts it is desirable to use low melting point metal for the sleeves 16 and 30. On the other hand strong metal should be used for the sleeves 25 and 46 and for many practical purposes steel and iron are preferred but bronze and brass and in some cases aluminum can be used. For rocket nozzles I may prefer to use titanium metal which has a melting point of 1800° C. in which case the ceramic piece, which in that case might be a cone or a Venturi shape, should be able to withstand such a temperature. Molded boron carbide can withstand 1800° C. and so can sintered alumina made out of 99.5% Bayer alumina as hereinbefore described. I give in the following table a number of examples of metals and alloys, both low melting point and tough metals, which can be used in accordance with this invention, it being understood that many other metals and alloys are also suitable for use in the present invention, this table giving merely a representative list.

Table IV

ALUMINUM ALLOYS

| Formula | Common Name or Trademark | Melting Point, Degrees Centigrade |
|---|---|---|
| 94 Al 4 Cu .5 Mg .5 Mn | "Alclad" 17 ST | 540 |
| 90 Al 10 Mg | "Magnalium" | 600 |
| 70 Al 30 Mg | "Magnalium" | 435 |
| 95 Al 5 Si | Aluminum-Silicon | 600 |

BIZMUTH ALLOY

| 60 Bi 40 Cd | | 144 |

COPPER ALLOYS

| 59 Cu 1.0 Al 1.0 Fe 0.22 Mn .09 Sn Balance Zn. | Manganese Bronze | 890 |
| 50 Cu 50 Zn | ASTM 50-50 Brazing Alloy. | 705 |
| 47 Cu 42 Zn 11 Ni | White Brazing Rod | 750 |

IRON ALLOYS

| 97.15 Fe 2.0 C .85 Si | White Cast Iron | 1,370 |
| 1.0-2.75 Si 2.7-3.6 C Balance Fe. | Gray Iron | 1,200 |

LEAD ALLOYS

| 99.8 Pb .2 As | Lead Shot | 327 |
| 94 Pb 6 Sb | Battery Plates | 300 |
| 92 to 94 Pb 6 to 8 Sb | Antimonial Lead | 260 |
| 90 Pb 10 Sb | "Magnolia" | 270 |
| 85 Pb 15 Sb | | 250 |
| 92 Pb 8 Cd | Aluminum Solder | 310 |
| 99.93 Pb .08 Cu | Chemical Lead | 327 |
| 67 Pb 33 Sn | Plumber's Solder | 275 |
| 84.7 Pb 4 Sn 11.3 Sb | Stereotype Metal | 260 |

MAGNESIUM ALLOYS

| 92 Mg 8 Al | "Dowmetal" A | 600 |
| 88 Mg 12 Al | "Dowmetal" B | 575 |
| 85 Mg 15 Al | "Dowmetal" C | 590 |

SILVER ALLOYS

| 50 Ag 15.5 Cu 16.5 Zn 18 Cd | Easy Flow | 510 |
| 15 Ag 80 Cu 5 P | Sil Fos | 520 |
| 10 Ag 52 Cu 38 Zn | | 640 |

STEEL ALLOYS

| 0.20 C 19 Cr 9 Ni Balance Fe | Type CF Cast Stainless Steel. | 1,450 |
| 99.80 Fe .20 C | Low Carbon Steel | 1,500 |
| .2-.5 C .5-1.0 Mn .2-.7 Si .05 P max. .06 S max. Balance Fe. | Medium Carbon Cast Steel. | 1,450 |

TIN ALLOYS

| 90 Sn 10 Sb | Brittania | 255 |
| 80 Sn 20 Sb | | 320 |
| 97 Sn 3 Cu | Rhine Metal | 300 |

ZINC ALLOYS

| 96 Zn 4 Al .05 Mg | "Zamak" 3 | 380 |
| 95 Zn 4 Al 1 Cu .05 Mg | "Zamak" 5 | 380 |
| 93 Zn 4 Al 3 Cu .05 Mg | "Zamak" 2 | 380 |
| 17.5 Zn 82.5 Cd | "High" temp. solder | 275 |

I may also make a reinforced ceramic body of revolution by centrifugal casting. Referring now to Figures 5 and 6 I provide a rotatable mold body 55 made of steel and having a removable end plate 56 also made of steel in which is a central pouring hole 57. The mold body 55 is a hollow cylinder ground on the inside and having an end wall 58 and therefore has the shape of a crucible. The removable end plate 56 is a disc with a central hole.

Located in holes 59 in the end wall 58 are pins 60 which project into the mold 55 and are tapered at the inside ends. Located in holes 61 in the end plate 56 are pins 62 which project beyond the inside face of the plate and are tapered at the inside ends. The pins 60 and 62 are made of steel and are welded in the holes. Those portions of the holes 59 and 61 outside of the pins 60 and 62 can be used for spanner wrenches to assemble and to disassemble the parts. Preferably I further provide on the cylindrical surfaces of the mold body 55 and of the end plate 56 additional holes 63 and 64 also for spanner wrenches.

Headed pins 65 extend into the annular end of the mold body 55 and are firmly fixed in position by taper pins 66 extending therethrough. Referring now to Figure 6 there are a number of holes 67 through the end plate 56, the holes 67 being larger in diameter than the heads of the pins 65, being equal in number to the pins 65 and being located radially and circumferentially in the end plate 56 the same as the pins 65 are located in the annular end of the mold body 55. Slots 68 in the end plate 56 extend arcuately from the holes 67 in the same direction of rotation and around the slots 68 and the holes 67 are inclined portions 69 which are at a level well in from the face of the plate 56 adjacent the holes 67 and gradually approach and finally merge with the face of the plate 56 near the ends of the slots 68. The foregoing features constitute multiple bayonet locks for quickly securing and removing the end plate 56 to and from the mold body 55 by the aid of spanner wrenches.

I further provide a pair of rather large diameter parallel steel shafts 70 (only one shown) spaced apart at any convenient instance so that the mold body can rest thereon as indicated in Figure 5. These shafts 70 are journalled in suitable bearings, not shown, and at least one but preferably both are rotatably driven by adjustable speed mechanism. If both of the shafts 70 are driven they are geared together to rotate at the same angular velocity and in the same direction. The speed of the shaft or shafts 70 should be variable from very slow, say 60 R. P. M. to a top speed which depends on the size of the mold and is calculated to yield a substantial centrifugal force on the metal being cast. Usually a centrifugal force equivalent to 10 $g$ ($g$=gravity=32 feet per second per second) will be sufficient though a greater force may be provided. As $v_2=Gr$ where G is centrifugal force in feet per second per second and $v$ is linear velocity in feet per second and $r$ is radius in feet it turns out that $G=12$ $g$ (in round numbers) where the inside diameter of the mold is one tenth of a foot and the mold is rotating at 600 R. M. P.

For the manufacture of a composite article by centrifugal casting with the apparatus of Figures 5 and 6 I first preheat the mold body 55 to a temperature of about 600° C. and preheat a ceramic cylinder 71 to 1000° C., place the mold body 55 on the shafts 70 which should at that time be stationary, insert the cylinder 71 in the mold body 55, quickly secure the removable end plate 56 to the mold body 55, pour molten cast iron through the central pouring hole 57 until it barely overflows, then start the shafts 70 rotating slowly and gradually accelerate the angular velocity thereof to the maximum. The ceramic cylinder 71 floats in the molten cast iron and the taper pins 60 and 62 urge it towards a central position in the mold. When centrifugal force has built up to a little over 1 $g$ at the locus of the pins 60 and 62 the molten iron 72 assumes the shape of a cylinder and in this molten iron the ceramic cylinder 71 "floats," that is to say it will assume a position coaxial with the axis of rotation of the mold because, being lighter than the iron, the centrifugal field which is similar to a gravitational field, puts it in a position of stable equilibrium in the center of the rotating mold. The rotation of the mold is continued at an angular velocity which will yield well over 1 $g$ as a matter of precaution and in order to eliminate air bubbles and reduce oscillations of the melt and gradually the cast iron 72 starts to freeze. The rotation is continued until all of the metal has frozen whereupon the shafts 70 are stopped, the end plate 56 is removed, and the formed composite piece constituting a ceramic cylinder 71 embedded in a piece of cast iron in compression against it axially and radially is removed from the mold 55. The foregoing can be accomplished because cast iron has a lower melting point than steel as shown in Table IV.

A discussion of the theory and practice of centrifugal molding of ferrous metals will be found in U. S. Patent No. 2,400,495. The description herein given is to be taken as illustrative.

The steel of those listed in Table IV which I prefer for the embodiments of Figures 2, 4 and 5 is the medium carbon cast steel. The iron which I prefer is white cast iron. The brass which I prefer for these embodiments is, of those listed in Table IV, the white brazing rod alloy. I have only listed one bronze in Table IV but many others could be used for the embodiments of Figures 2, 4 and 5. The low melting point alloys which I prefer for the embodiments of Figures 1 and 3 are the zinc alloys listed but if the articles in use will be heated to high temperatures I prefer the "Sil Fos" silver alloy and the 50-50 brazing alloy.

In the embodiments of Figures 2 and 4 where the sleeve 25 and metal support 46 are cast in situ, the equation for the interference fit is simple, being (1) $\quad i=(b-c)Td$ where $i$ is the diametral interference per unit diameter, $b$ is the linear coefficient of expansion of the cast body such as the sleeve 25 or the metal support 46, $c$ is the linear coefficient of expansion of the ceramic piece 10 or 45 and $Td$ is the temperature difference between room temperature and the melting point of the metal that is cast. Thus some steels have a coefficient of expansion in degrees centigrade of $12 \times 10^{-6}$ and ceramic pieces of the nature herein described frequently have a coefficient of expansion of about $7 \times 10^{-6}$ and assuming the melting point of the steel is around 1400° C. above room temperature, the equation is $$i=(12-7) \times 10^{-6} \times 1400$$
$$i=7 \text{ mils per inch.}$$

This interference can be withstood by many steels and also by ceramic pieces of reasonable thickness. So far as steels are concerned, press fitting practice has produced interference fits much greater than 7 mils per inch, for example as high as 25 mils per inch. In the practicing of my invention I will not have interference fits of greater than 10 mils per inch because of the limitations in the possible values of $Td$.

Where metal is cast between an outer metal sleeve and an inner ceramic piece as in the embodiments of Figures 1 and 3, the equation is (2) $\quad i=(b-c)Td-(2e/D)(f \times Td+V/3)$ where $i$, $b$, $c$, and $Td$ are as above identified, $e$ is the radial thickness of the cast intermediate sleeve 16 or 30, D is the mean diameter of such cast intermediate sleeve, $f$ is the coefficient of linear expansion of such cast intermediate sleeve, and V is the volumetric contraction per unit volume of the metal forming the intermediate sleeve on freezing.

As an example of the application of the above equation let us assume an assembly which is one and one-half inches in diameter made by casting an intermediate sleeve .050 inch thick of "stereotype" metal having a melting point of about 260° C. and having a volume contraction on freezing of 2.0% and a coefficient of expansion of $30 \times 10^{-6}$ per degree centigrade and having an outer sleeve or band (such as 25 or 46 or 72) which has a coefficient of expansion of $12 \times 10^{-6}$ and having an internal ceramic piece with a coefficient of expansion of $7 \times 10^{-6}$ (all of the coefficients on the centigrade scale) the equation becomes:

$i = (12-7) \times 10^{-6} \times 260 -$
$\qquad (2 \times .050/1.5)(30 \times 10^{-6} \times 260 + .02/3)$
$i = 1.3 \times 10^{-3} - .067(7.8 \times 10^{-3} + 6.7 \times 10^{-3})$
$i = 1.3 \times 10^{-3} - 0.97 \times 10^{-3}$
$i = 0.3 \times 10^{-3} = 0.3$ mil per inch.

This figure of 0.3 mil per inch is a low interference fit which, however, is adequate for some purposes and is about the lowest interference fit of practical use in accordance with this invention.

It must be understood that the foregoing calculations assume no plastic flow or deformation or extrusion or the like of the metal being cast. To a certain extent one or more of these phenomena will always occur. Calculations thereon would however be extremely intricate and in some cases practically impossible. It is sufficient for the practicing of the invention to bear in mind that the interference fit should be as great as possible provided the central ceramic sleeve has a reasonable wall thickness which ordinarily should not be less than one-tenth of its diameter but preferably in most cases not thinner than one-fifth of its diameter. However it is preferable in most cases not to design a composite article in accordance with this invention to have an interference fit of greater than 7 mils per inch and indeed it is difficult to create greater interference fits. It will be noticed from the long equation above that increasing the wall thickness of the intermediate cast metal sleeves decreases the interference fit wherefore in most cases the design will call for very thin intermediate sleeves.

However Equation 2 is for cases where the intermediate sleeve is made of metal of relatively low strength or of little thickness or both and in case the intermediate sleeve envelopes the ends of the ceramic body, in which case it should be of strong metal and of reasonable thickness, Equation 1 should be used applying it to the intermediate sleeve. In borderline cases involving an intermediate sleeve having a melting point above 500° C., the equation yielding the greater value of $i$ is the one to apply.

In the claims I refer to the parts 15, 16, 25, 29, 30, 46, 47 and 72 generically as envelopes and they are said to be mating with and in compression against something inside and/or enveloping it and in axial compression against it. I use the word "comminuted" in its proper sense to include granular material, that is to say a mass of particles of aluminum oxide, silicon carbide, etc. the individual particles of which are large enough to be visible and also a mass of clay or the like which indeed consists of individual particles but which particles are so small that they cannot be seen by the naked eye. Since in accordance with the foregoing disclosure the ceramic bodies of revolution can be made by sintering the various oxides, etc. on the one hand and can be made by fusing impalpably fine clay on the other hand, the starting material for the manufacture of the ceramic body of revolution is generically described as comminuted material. I have specified generically that the ceramic piece is at a temperature not lower than 300° C. below the melting point of the metal being cast because if this precaution is observed the ceramic body of revolution will not be fractured. However, as heretofore stated, in certain embodiments of the method of this invention the ceramic body of revolution is at a temperature at least as high as that of the molten metal being cast. If it is possible to make an article meeting the requirements by casting with metal having a melting point not higher than 750° C., I prefer to use such metal as it simplifies the manufacturing operation.

It will thus be seen that there has been provided by this invention reenforced ceramic bodies of revolution and methods of making the same in accordance with which the various objects hereinbefore set forth together with many thoroughly practical advantages are successfully achieved. It will further be seen that the outer portion of the article, whether it is formed by casting metal or whether it is a pre-formed outer metal body, need not be cylindrical nor of any particular shape on the outside although it is so in the examples except in the case of the embodiment of Figure 3. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

I claim:

1. A composite article comprising an inner ceramic body of revolution having a compressive strength greater than 100,000 pounds per square inch and a hardness of at least 7 on Mohs's scale, the major portion of the material of said body being selected from the group consisting of silicates, other oxides and carbides, a metal envelope mating with and in compression against said inner ceramic body, said metal having a melting point between 140° C. and 1800° C., said compression being on a calculated interference fit basis from .3 mil to 10 mils per inch, and an outer metal envelope surrounding and mating with said envelope mating with the inner ceramic body, said outer metal envelope being of metal having a higher melting point than the metal of the envelope mating with the inner ceramic body and said outer metal envelope being in compression against said envelope mating with the inner ceramic body with a compression which on a calculated interference fit basis is from .3 mil to 10 mils per inch.

2. A composite article according to claim 1 in which the metal of the envelope mating with the inner ceramic body has a melting point of from 140° C. to 750° C.

3. A composite article according to claim 1 in which the outer metal envelope is made of ferrous metal selected from the group consisting of cast irons and steels.

4. A composite article according to claim 3 in which the metal of the envelope mating with the inner ceramic body has a melting point of from 140° C. to 750° C.

5. A composite article comprising an inner ceramic hollow body of revolution having a rough irregular external surface and having a compressive strength greater than 100,000 pounds per square inch and a hardness of at least 7 on Mohs's scale, the major portion of the material of said body being selected from the group consisting of silicates, other oxides and carbides, and a metal envelope mating with and in compression against said inner ceramic body, said metal having a melting point between 140° C. and 1800° C., said compression being on a calculated interference fit basis from .3 mil to 10 mils per inch, and said metal envelope at least partially enveloping the ends of the ceramic body and said metal envelope being in axial compression against said ends of said ceramic body with a compression which on a calculated interference fit is from .3 mil to 10 mils per inch.

6. A composite article according to claim 5 in which the metal envelope is made of ferrous metal selected from the group consisting of cast irons and steels.

References Cited in the file of this patent

UNITED STATES PATENTS

| Number | Name | Date |
|---|---|---|
| 939,833 | Harlow | Nov. 9, 1909 |
| 1,181,603 | McClean | May 2, 1916 |
| 1,362,773 | Brewster | Dec. 21, 1920 |
| 1,665,445 | Conrad | Apr. 10, 1928 |
| 1,701,656 | Arkema et al. | Feb. 12, 1929 |
| 1,723,026 | Ford | Aug. 6, 1929 |
| 1,910,884 | Comstock | May 23, 1933 |
| 1,926,770 | Harris | Sept. 12, 1933 |
| 1,982,179 | Scharschu | Nov. 27, 1934 |

(Other references on following page)

UNITED STATES PATENTS

| | | | |
|---|---|---|---|
| 1,993,774 | De Bats | Mar. 12, | 1935 |
| 2,015,483 | Lilienfeld | Sept. 24, | 1935 |
| 2,017,757 | Keller et al. | Oct. 15, | 1935 |
| 2,149,702 | Maris | Mar. 7, | 1939 |
| 2,149,827 | Andre | Mar. 7, | 1939 |
| 2,255,184 | Osenberg | Sept. 9, | 1941 |
| 2,398,132 | Cottrell | Apr. 9, | 1946 |
| 2,431,927 | Fairbank | Dec. 2, | 1947 |
| 2,446,908 | Corbin | Aug. 10, | 1948 |
| 2,462,699 | Wilcox | Feb. 22, | 1949 |
| 2,471,855 | Bird | May 31, | 1949 |
| 2,483,056 | Leckie | Sept. 27, | 1949 |
| 2,500,405 | Fairbank | Mar. 14, | 1950 |
| 2,537,804 | Watkins | Jan. 9, | 1951 |
| 2,581,252 | Goetzel et al. | Jan. 1, | 1952 |
| 2,593,751 | Grolee | Apr. 22, | 1952 |
| 2,612,443 | Goetzel et al. | Sept. 30, | 1952 |
| 2,640,503 | Mulligan et al. | June 2, | 1953 |

FOREIGN PATENTS

| | | | |
|---|---|---|---|
| 514,292 | Great Britain | Nov. 3, | 1939 |